Patented May 29, 1928.

1,671,792

UNITED STATES PATENT OFFICE.

BUREN I. STOOPS, OF KENVIL, NEW JERSEY, ASSIGNOR TO HERCULES POWDER COMPANY, OF WILMINGTON, DELAWARE, A CORPORATION OF DELAWARE.

METHOD OF IMPREGNATING ABSORPTIVE MATERIAL FOR USE IN EXPLOSIVES.

No Drawing.  Application filed April 2, 1927. Serial No. 180,622.

My invention relates to a method of impregnating absorptive material for use in explosives and more particularly to a method of impregnating such materials as sawdust, plant tissue, etc. with inert salts, oxidizing salts, explosive salts or combinations thereof.

Heretofore in the manufacture of explosives, it has been known to impregnate absorptive materials as sawdust, plant tissue and the like with sodium nitrate, or ammonium nitrate, or both and to mechanically admix the impregnated material with sodium nitrate, or amomnium nitrate, or both for the production of an explosive; and it has appeared that an explosive including material so impregnated is advantageous over an explosive including the same material unimpregnated.

The impregnation of absorptive materials, such as sawdust, plant tissue, etc. for use in connection with explosives, has heretofore presented a problem of some difficulty and prior to my invention, to be hereinafter described, no entirely satisfactory method of impregnation has been devised.

Among the methods of impregnation heretofore known, one involved mixing sawdust or plant tissue with a saturated aqueous solution of ammonium nitrate and evaporating to dryness (U. S. Patent No. 1,444,594); another method involves the admixing of sodium and ammonium nitrate and fusing the mixture (U. S. Patent No. 1,568,324).

The former of the above methods of impregnation is unsatisfactory in that the impregnated material is difficult to dry, since the last traces of water are retained tenaciously so that inordinately long periods of drying at moderate and safe temperatures, or relatively short periods at comparatively unsafe temperatures are required to secure a dry product. The product when properly dried is also unsatisfactory, since it tends to crumble and during storage, screening and mixing into explosives breaks down more or less into finer particles, rendering control of velocity of detonation difficult if not impossible.

The latter of the above mentioned methods is unsatisfactory, since such high temperatures are required as to be unsafe in plant practice and the material to be impregnated is usually charred by the heat.

Now, in accordance with my invention, I effect the impregnation of the material to be impregnated by causing a solution formed by dissolving a salt normally containing water of crystallization, alone or mixed with another salt or salts, in water of crystallization to permeate absorptive material and subsequently effecting re-crystallization of the salt normally containing water of crystallization within the absorptive material. For example, the impregnation may be effected, by fusing a salt containing water of crystallization, alone or with an additional salt or salts, as sodium or ammonium nitrate, adding the material to be impregnated to the fused mass or melt and cooling. The salts containing water of crystallization on heating will melt in their own water of crystallization and when another salt or salts, as sodium or ammonium nitrate, is used, such salts will also be dissolved by the water of crystallization. The fused or melted mass will readily permeate the material to be impregnated and when the melt or the material permeated thereby is allowed to cool, the salt originally containing water of crystallization will take back to itself the water of crystallization present and will form a solid dry crystal, while the other salts as the sodium or ammonium nitrate or both, will on cooling, crystallize and form solid dry crystals, thus the product, i. e. the impregnated material, requires no subsequent drying.

As illustrative of salts containing water of crystallization and which may be used either alone or with sodium or ammonium nitrate, or both, in the carrying out of the method in accordance with my invention, may be mentioned magnesium nitrate

which will melt in its own water of crystallization at 90° C., calcium nitrate

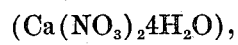

which melts in its own water of crystallization at 42.7° C., sodium sulphate

and other hydrated salts, it being only necessary that where the hydrated salt is used with some other salt, a hydrated salt be selected which will not cause decomposition when fused with such other salt.

As an example of the carrying out of the process according to my invention where impregnation of absorptive material with a salt containing water of crystallization alone is desired, a quantity of calcium nitrate, for example, is heated to 42.7° C., at which temperature it becomes liquid, the salt melting in its own water of crystallization. To the melt is then added the absorptive material, as sawdust, plant tissue, or the like and the melted salt readily permeates and impregnates it. The melt is then allowed to cool and the salt recrystallizes, taking back to itself the water of crystallization, with the result that the absorptive material is impregnated with the salt in the form of solid, dry crystals, without the necessity of any further drying operation.

As an example of the carrying out of the method according to my invention, when the absorptive material is desired to be impregnated with an explosive salt, as ammonium nitrate, or an oxidizing salt, as sodium nitrate, a quantity of ammonium nitrate is heated to about 110° C. in a steam jacketed kettle and 5% or more of magnesium nitrate added. The mixture becomes liquid at temperatures ranging from 80° C.–140° C. due to the release of the water of crystallization of the magnesium nitrate, which acts to dissolve both the magnesium nitrate and the ammonium nitrate. When the mixture has become liquid, the absorptive material, as sawdust, plant tissue, or the like, is added to the melt, preferably with agitation, and the steam pressure maintained until the absorptive material is thoroughly wet. The steam pressure is then shut off and the agitation preferably continued until the temperature has dropped below the freezing point of the mixture of salts used. When cold, a hard, dry product is obtained, which requires no further drying and is ready for use as an ingredient of an explosive.

It will be understood that in carrying out the method according to my invention, the desired absorptive material may be impregnated with a salt containing water of crystallization only, whether such be a nitrated salt or not, or with mixtures of such a salt with other salts, as ammonium, sodium or potassium nitrate, ammonium perchlorate, etc. or mixtures thereof, it being only necessary to avoid the use of a salt containing water of crystallization which on heating in admixture with such other salt or salts as may be used, will cause decomposition.

The impregnation of absorptive material according to the method embodying my invention is highly advantageous in that it permits the production of an explosive containing increased quantities of sodium nitrate in mechanical mixture with the impregnated material, since the salt containing water of crystallization acts as a flame reducer; in that it enables the production of an explosive of increased sensitiveness, which will resist hardening or setting to a high degree and which will retain its sensitiveness in storage even at relatively high temperatures; and in that due to the low absorptive powers of the impregnated material, its use enables reduction in the amount of liquid explosive as nitroglycerin, required for an explosive; and it may be used in high percentages, thus increasing the cartridge count of the so called permissible explosives. Further, the material impregnated according to my invention may be utilized in the production of gelatin dynamite, in which it will maintain sensitiveness even under hot storage, and due to its low absorptive power enables the density of gelatin dynamite to be decreased with increase in cartridge count per hundred pounds.

It will be understood that the material impregnated according to the method of my invention, may be utilized as an ingredient in blasting explosives, other than black powder, generally.

Having now fully described my invention, what I claim and desire to protect by Letters Patent is:—

1. The method of producing an explosive, which includes fusing an explosive salt, an oxidizing salt and a salt containing water of crystallization, subjecting absorptive material to the melt and cooling the absorptive material.

2. The method of producing an explosive, which includes fusing ammonium nitrate and a salt containing water of crystallization and which will not cause decomposition on heating with the ammonium nitrate, subjecting absorptive material to the melt and cooling the absorptive material.

3. The method of producing an explosive, which includes fusing ammonium nitrate and a metallic salt containing water of crystallization and which will not cause decomposition on heating with the ammonium nitrate, subjecting an absorptive material to the melt and cooling the absorptive material.

4. An explosive including an explosive ingredient and carbonaceous material impregnated with a salt containing water of crystallization the impregnation being effected through the medium of water of crystallization.

5. An explosive including an explosive ingredient and carbonaceous material impregnated with a salt containing water of crystallization and ammonium nitrate the impregnation being effected through the medium of water of crystallization.

6. The method of impregnating absorptive material for use in explosives, which includes forming a solution of a salt containing water of crystallization in water of crystallization by the application of heat to the salt, subjecting an absorptive material to the solution and cooling to effect crystallization of the salt.

7. An explosive including an explosive ingredient and carbonaceous material impregnated with a salt containing water of crystallization and a nitrate salt the impregnation being effected through the medium of water of crystallization.

8. An explosive including an explosive ingredient and carbonaceous material impregnated with a salt containing water of crystallization and an oxidizing salt the impregnation being effected through the medium of water of crystallization.

9. The method of impregnating absorptive material, which includes causing a solution of a salt containing water of crystallization in water of crystallization to permeate absorptive material and effecting re-crystallization of the salt within the absorptive material.

10. The method of impregnating absorptive material, which includes causing a solution of a plurality of salts, one of which contains water of crystallization, in water of crystallization to permeate absorptive material and effecting re-crystallization of the salts within the absorptive material through re-crystallization of the salt normally containing water of crystallization.

11. The method of impregnating absorptive material for use in explosives, which includes causing a solution of a plurality of salts, one of which is a nitrate and one of which contains water of crystallization, in water of crystallization to permeate absorptive material and effecting re-crystallization of the salts within the absorptive material through re-crystallization of the salt normally containing water of crystallization.

12. The method of impregnating absorptive material for use in explosives, which includes forming a solution of a salt containing water of crystallization by the release of water of crystallization therefrom, subjecting absorptive material to the solution formed and effecting re-crystallization of the salt absorbed by the absorptive material.

13. The method of impregnating absorptive material for use in explosives, which includes forming a solution in water of crystallization of a mixture of salts, one of which contains water of crystallization, by the application of heat, subjecting an absorptive material to the solution and cooling to effect crystallization of the salts.

14. The method of impregnating absorptive material, which includes subjecting an absorptive material to a salt containing water of crystallization in solution in its water of crystallization.

15. The method of impregnating absorptive material for use in explosives, which includes fusing a salt containing water of crystallization, subjecting an absorptive material to the melt and cooling the absorptive material.

16. The method of producing an explosive, which includes fusing a nitrated salt and a salt containing water of crystallization, subjecting an absorptive material to the melt and cooling the absorptive material.

17. The method of producing an explosive, which includes fusing an ammonium salt and a salt containing water of crystallization and which will not cause decomposition when fused with the ammonium salt, subjecting absorptive material to the melt and cooling the absorptive material.

18. The method of producing an explosive, which includes fusing a nitrated metallic salt and a metallic salt containing water of crystallization, subjecting absorptive material to the melt and cooling the absorptive material.

19. The method of producing an explosive, which includes fusing a nitrated salt and a metallic salt containing water of crystallization and which will not cause decomposition when heated with the nitrated salt, subjecting absorptive material to the melt and cooling the absorptive material.

In testimony of which invention, I have hereunto set my hand, at Kenvil, New Jersey, on this 23rd day of March, 1927.

BUREN I. STOOPS.